Figure 1:
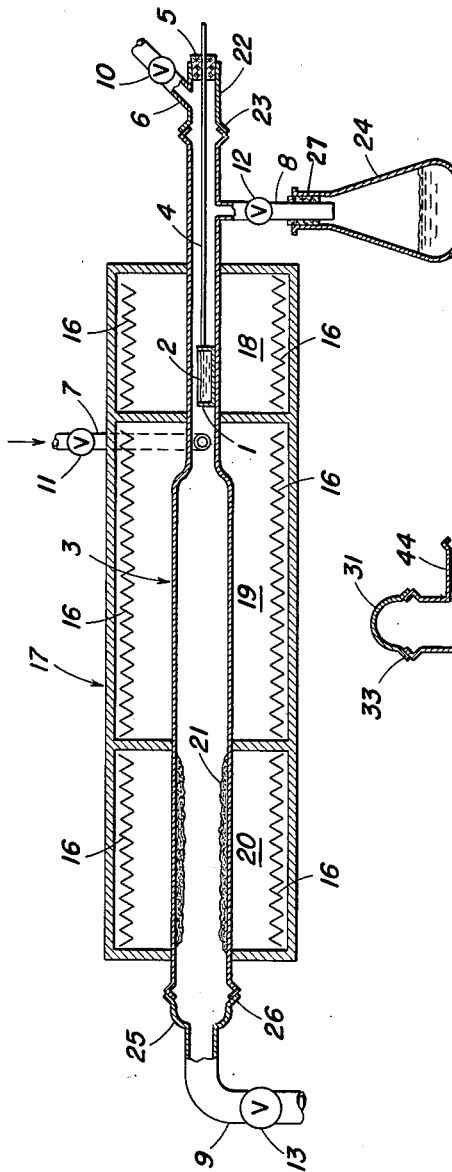

Nov. 9, 1965    J. A. BROTHERS ETAL    3,216,822
PRODUCTION OF NIOBIUM BY VAPOR PHASE
REDUCTION OF NIOBIUM PENTACHLORIDE
Filed Feb. 28, 1962

INVENTORS
James A. Brothers
William F. Pesold
BY
Bernhard R. Swick
ATTORNEY

United States Patent Office 3,216,822
Patented Nov. 9, 1965

3,216,822
PRODUCTION OF NIOBIUM BY VAPOR PHASE REDUCTION OF NIOBIUM PENTACHLORIDE
James A. Brothers, Trenton, and William F. Pesold, Wyandotte, Mich., assignors to Wyandotte Chemicals Corporation, Wyandotte, Mich., a corporation of Michigan
Filed Feb. 28, 1962, Ser. No. 176,364
10 Claims. (Cl. 75—84.5)

This invention relates to the production of metals of the group niobium, tantalum, molybdenum and tungsten. More particularly, this invention relates to the production of these metals by reduction of the halides thereof with zinc.

Several methods are known for the production of niobium, tantalum, molybdenum or tungsten from their halides by reduction with a reducing agent such as magnesium, sodium and zinc to produce the desired metal and the halide of the reducing metal. The prior art processes possess certain inherent disadvantages since they generally fail to completely reduce the metal halide or require very large excesses of reducing agent. This is particularly significant since in general the metal halide is a far more expensive substance than the reducing metal. In addition, these metal reducing agents possess an affinity for elements such as oxygen the presence of which in the final niobium, tantalum, molybdenum or tungsten product results in a brittle, hard-to-work metal. Magnesium and sodium possess the additional disadvantage that their chlorides are more difficult to separate from the desired metal than zinc chloride and zinc chloride is a more useful by-product.

Where zinc is employed as a reducing agent, in accordance with the prior art practice, the halide of the metal is charged into a reaction vessel with a finely divided solid or liquid zinc of about 99.99% purity. The reaction vessel is closed and the mixture is heated to and maintained at the desired temperature until reduction is complete to an economically practical extent. Such prior art practice has certain inherent disadvantages, particularly with regard to the slowness of the reduction reaction and the necessity of employing oxide free zinc of at least 99.99% purity. Due to the affinity of zinc for oxygen the oxide content of initially pure zinc in finely divided solid or liquid form tends to increase to detrimental amounts in the absence of expensive special handling. Since the reaction is carried out in a closed container, it is not adapted for continuous processing and the advantages in production and efficiency which attend continuous processing. This also limits the process with regard to the rate of production which may be attained in a relatively small reactor.

Accordingly, it is the purpose of this invention to provide a method for producing niobium, tantalum, molybdenum or tungsten, mixtures and/or alloys thereof and their hydrides from their halides which employs zinc as the reducing agent, wherein the reduction is rapid, the halides can be completely reduced without employing unduly large excesses of reducing agent, zinc of 99.99% purity is not essential and which is adapted for continuous operation.

The method of the present invention comprises passing zinc vapor into contact with a chloride of a metal selected from the group consisting of niobium, tantalum, molybdenum and tungsten in a reaction zone maintained at a temperature of from about 750 to 1100° C. to effect reduction of the chloride to produce a mixture of the desired metal product and other materials such as zinc chloride and excess zinc. In order to obtain the above recited advantages of this invention, it is essential to maintain the reaction zone at a temperature of at least about 750° C.

While 1100° C. is a practical working maximum reaction zone temperature, higher temperatures may be employed if desired. This reaction is very rapid and may be instantaneous and the metal chloride can be completely reduced. The affinity of zinc for oxygen does not present a problem with this method since the oxides of zinc are not carried with the zinc vapor but remain in the molten zinc source of the vapor. The resulting metal product may be easily recovered since zinc chloride and zinc are easily separated from pure niobium, tantalum, molybdenum and tungsten by distillation. If desired, the hydride of the metal may be produced by contacting the metal with hydrogen while at a temperature of from about 350° to 550° C.

The chloride of a single metal may be employed or the chlorides of two or more metals may be employed to produce a multimetallic product. This multimetallic product may be a mixture of the metals, an alloy or a mixture of both pure metals and alloys. While, in general, this invention will be described as pertaining to the production of a single metal by reduction of the halide thereof, it is to be distinctly understood that the method applies equally well to the production of a multimetallic product by reduction of the chlorides of at least two metals selected from the group consisting of niobium, tantalum, molybdenum and tungsten.

Except for an alternative embodiment of this invention described below, it is necessary to employ an amount of zinc at least equal to and preferably in excess of the stoichiometric equivalent of the chlorine content of the metal chloride in order to completely reduce the chloride to pure metal. While this reduction is essentially stoichiometric, a small excess of zinc is often necessary to completely reduce the chloride due to inefficient mixing of the chloride and zinc vapors. It has been found that while the desired results may be obtained with a large excess, a relatively small excess is preferred. An excess of about 100% of stoichiometric has been found to be a practical working maximum amount of zinc although higher excesses may be employed if desired. For example, in producing niobium from niobium pentachloride the amount of zinc should be at least equal to and preferably in excess of the theoretical amount required by the equation: $2NbCl_5 + 5Zn \rightarrow 2Nb + 5ZnCl_2$. Where the metal is tantalum or molybdenum and the chloride is the pentachloride, a similar equation and relationship applies. Where the metal is tungsten and the halide is tungsten hexachloride, the amount of zinc should be at least equal to and preferably in excess of the theoretical amount required by the equation: $WCl_6 + 3Zn \rightarrow 3ZnCl_2 + W$.

It has been found, in accordance with one embodiment of this invention, that hydrogen may be mixed with the zinc vapor in an amount of at least about two times the stoichiometric equivalent of the chlorine content of the metal chloride. Where hydrogen is mixed with the zinc in such amount, the amount of zinc employed may be less than the stoichiometric equivalent of the chlorine content of the metal chloride. This has a substantial advantage in ease of recovery of the desired metal from the product of the reaction since there is no need for removal of zinc metal. Any amount of hydrogen greater than the above recited minimum may be employed with satisfactory results. However, a practical working maximum is twenty times the stoichiometric equivalent of the chlorine content of the metal chloride.

Where hydrogen is mixed with zinc for this purpose, it is preferred to employ an amount of zinc of about 80 to 95 percent of the above stoichiometric equivalent. For example, where niobium pentachloride is reduced with a zinc vapor and hydrogen mixture, the amount of zinc may be less than the theoretical amount required by the equation: $2NbCl_5 + 5Zn \rightarrow 2Nb + 5ZnCl_2$ and, preferably, the amount of zinc should be 80 to 95 percent of the amount required by the above equation. Where the metal is tantalum or molybdenum and the chloride is the pentachloride, a similar equation and relationship applies. Where the metal is tungsten and the chloride is tungsten hexachloride, the amount of zinc may be less than and preferably 80 to 95 percent of the theoretical amount required by the equation: $WCl_6 + 3Zn \rightarrow 3ZnCl_2 + W$.

Figure 2:
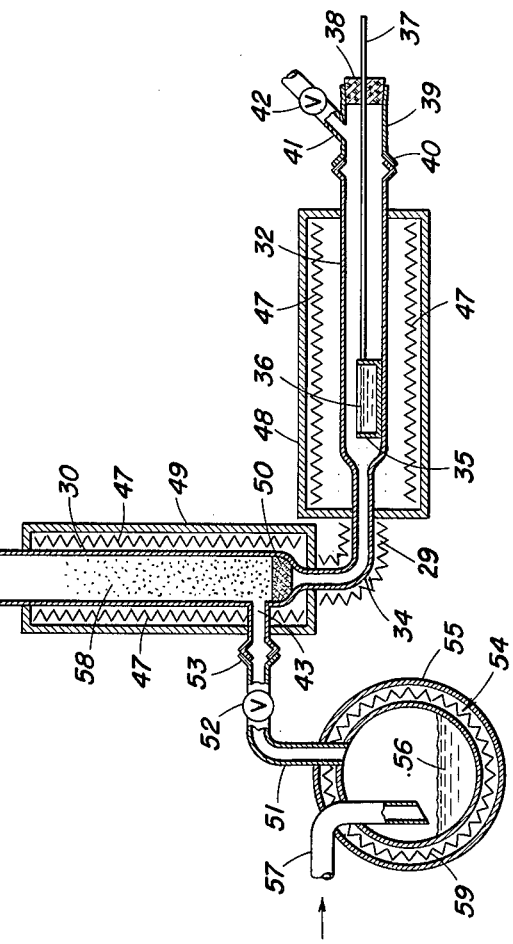

The accompanying drawings illustrate presently preferred apparatus for performing the method of this invention wherein FIGURE 1 is a diagrammatic illustration in section of one apparatus for performing the method of this invention, FIGURE 2 is a diagrammatic illustration in section of an alternative apparatus for performing the method of this invention.

With reference more particularly to FIGURE 1 of the drawings, it will be seen that the apparatus illustrated therein includes a container 1 of zinc 2 provided in a reaction vessel or reactor 3. Container 1 is provided with a control rod 4 which passes through suitable means such as a close fitting opening in a rubber stopper 5 in the end of the reactor 3. By means of control rod 4, the zinc container 1 may be moved toward or away from the control rod end of the reactor 3. This reactor may be composed of high purity silica, silica glass, quartz, graphite or any other suitable material which is nonreactive toward the reactants and products under the prevailing reduction conditions. The reactor 3 includes suitable inlets 6 and 7, an outlet 8 and a conduit 9 which may serve as both an inlet and an outlet. These are provided with suitable valves 10, 11, 12 and 13, respectively. Conventional furnacing means indicated diagrammatically at 17 which employs electric resistance elements 16 or other suitable heating means is associated with the reactor 3 to heat the reactor and maintain it at any desired temperature. The furnacing means 17 is divided into three sections or furnaces 18, 19 and 20 for maintaining three different temperature zones in the reactor 3.

In accordance with a presently preferred embodiment of this invention, a gas selected from the group consisting of inert gases and hydrogen is passed into association with, i.e. through or over, a body of zinc, which body is at a temperature of from about 750 to 950° C. to produce a mixture of the gas and zinc vapor in order to facilitate control of the flow of the zinc vapor.

To begin the operation, zinc 2 is placed in container 1 in the reactor 3 as shown. Valve 10 is opened and the inert gas or hydrogen passes through inlet 6 and over the zinc 2 in container 1. The preferred inert gases for carrying out the method of this invention are helium and argon, and particularly helium. The amount of inert gas or hydrogen employed generally is that amount which is sufficient to sweep the desired amount of zinc vapor from the zone just above the zinc into the reaction zone. This varies with the design and size of apparatus employed, the temperature of the zinc body, area of exposed zinc surface, gas flow and type of gas or gas mixture. The amount may be determined by a simple trial and error process which anyone skilled in the art is capable of performing.

Where hydrogen is employed in amounts of at least about two times the stoichiometric equivalent of the chlorine content of the metal chloride, it is preferred to employ an amount of zinc of from about 80 to 95 percent of the stoichiometric equivalent of the chlorine content of the metal chloride as stated above. However, an amount of zinc in excess of the stoichiometric equivalent may be employed just as in other embodiments of this invention.

Wherein inert gas is employed, hydrogen may be added to the inert gas in an amount of from about 5 to 30 percent by volume as an indicator of effective zinc deficiency in the gas stream. When there is insufficient zinc to completely reduce the chloride, the hydrogen reacts with the chloride to produce HCl. On the other hand, where there is an excess of zinc, the zinc reacts with any HCl that may be present to form zinc chloride and hydrogen. The gas from the reaction is bubbled through water and the pH of the water is checked with a suitable pH meter. When there is a deficiency of zinc, HCl appears in the gas and the pH of the water drops. The zinc deficiency may be corrected by replenishing the body of zinc, where the zinc body has been substantially consumed, or by adjusting one of the factors such as temperature which control the rate of flow of the zinc where the body of zinc is adequate. Alternatively, the chloride feed rate may be reduced.

The first section or furnace 18 of the furnacing means 17 is heated to a temperature of at least about 750° C. to provide adequate zinc vapor pressure whereby the gas entering through inlet 6 may become mixed with the zinc vapor. Temperature control of furnacing means 17 may be employed to control the percentage of zinc vapor in the gaseous mixture. With the zinc container 1 positioned as shown in FIGURE 1, the gas entering through inlet 6 is preheated by passing through a portion of the first furnace 18 before reaching the zinc container 1. The amount of preheat may be controlled by changing the position of container 1 through manipulation of control rod 4. As is apparent from FIGURE 1 of the drawing, when container 1 is moved toward inlet 6 the amount of preheating of the gas prior to contacting the zinc is decreased. This provides an additional means for controlling the percentage of zinc in the mixture of zinc and the gas entering through inlet 6 since with all other conditions maintained constant an increase in the amount of preheating of the gas entering through inlet 6 increases the percentage of zinc in the mixture.

By opening valve 11, the metal chloride is introduced into reactor 3 through inlet 7 wherein the chloride contacts the mixture of zinc vapor and the gas entering through inlet 6. The gas mixture is maintained by the second section or furnace 19 at a temperature of at least about 750° C. The metal chloride may be heated by conventional means in a suitable container to a temperature above its melting point and introduced as a liquid through inlet 7. The liquid then vaporizes in reactor 3 since this portion of the reactor is maintained at a temperature of at least about 750° C. Alternatively, the metal chloride may be vaporized in a container outside of reactor 3 by suitable heating means and introduced through inlet 7 as a gas. To assist in introducing the metal chloride gas and avoid high temperature heating an inert gas or hydrogen may be employed as a sweep gas over the liquid chloride. In general, this gas is the same as that entering through inlet 6. For this purpose, a generator such as generator 54 shown in FIGURE 2 and described below may be employed.

The flow rate of the gases is controlled such that the mixture of halide, zinc vapor and inert gas or hydrogen spends sufficient time in the portion of reactor 3 which is heated by section 19 of the furnacing means to completely react and reduce all the metal chloride to pure metal. This produces a mixture of the metal and other material such as zinc chloride and, possibly, unreacted zinc. This mixture is passed to the portion of the reactor 3 surrounded by the third section or furnace 20 of the furnacing means 17 which is maintained at a temperature ranging from about 300 to 550° C. wherein the mixture is cooled to this temperature range. In this temperature range the zinc chloride is in a viscous state whereby the refractory metal powder is trapped by the zinc chloride and the sticky mixture is deposited on the sides of the reactor 3 as indicated at 21. The inert gas or excess hydrogen and HCl leaves the reactor 3 through open valve 13 and conduit 9.

After a substantially large quantity of the metal, zinc chloride and unreacted zinc which may be present is deposited on the walls of the vessel in the portion surrounded by section 20 of the furnacing means, the zinc chloride and zinc are separated from the refractory metal by distillation. The mixed product, i.e. the refractory metal, zinc chloride and zinc, may be scraped from the sides of the reactor 3 in the condensing zone and placed in a suitable container provided with a heating device and the zinc chloride and zinc removed by distillation at atmospheric pressure or under vacuum. Alternatively, the zinc chloride and zinc may be distilled off by passing a gas selected from the group consisting of hydrogen and inert gases over the deposit and heating the deposit to a temperature greater than about 750° C. whereby other products are vaporized and carried away by the hydrogen or inert gas flow, leaving a deposit of the pure metal. Preferably, the major portion of the zinc chloride is removed at a temperature of about 750° C., after which the temperature is raised to 1100° C. to remove the balance of the zinc chloride and zinc. Since the major portion of the material is removed at 750 to 800° C. the impure metal may be transferred to a smaller container for the high temperature operation. Where an inert gas is employed a small amount of hydrogen may be mixed with the inert gas to assist in the removal of any trace of amounts of chloride that may be present. After the zinc chloride and zinc are removed, niobium and tantalum may be contacted with hydrogen at a temperature ranging from about 350 to 550° C. to produce the metal hydride or a mixture of the metal and metal hydride. This mixture has been found very useful in industrial applications as a source of niobium or tantalum since it is less subject to oxidation problems than pure niobium or tantalum. The conversion to hydride may be carried out during the cooling of the metal.

In accordance with a further embodiment of this invention, the mixture of the metal, zinc chloride and zinc is left on the walls of the reactor and the distillation carried out in the reactor 3. In accordance with this embodiment, the valves 10 and 11 are closed and the zinc container 1 is withdrawn to connecting means 23. Connecting means 23 and the other connections employed in the apparatus of FIGURES 1 and 2, and described below, may be any conventional type. Where the reactor is made of high temperature glass, a conventional ball and socket joint held together by clamps may be employed. Valves 12 and 13 are then opened and a gas selected from the group consisting of hydrogen and inert gases such as helium and argon and, preferably, helium is passed into the reactor 3 through valve 13 and conduit 9. The helium passes from conduit 9 over the deposit 21 through the reactor 3 and exits through outlet 8. The temperature in third furnace 20 is raised gradually as helium passes through from 750° C. to a temperature of about 1100° C. and the helium takes up the zinc chloride and zinc (if any) leaving a deposit of pure niobium, tantalum, molybdenum or tungsten metal on the walls on the section of the reaction vessel which is surrounded by third furnace 20 of the furnacing means. As the mixture of helium, zinc chloride and possibly zinc passes through second furnace 19, the temperature is maintained at a temperature greater than 900° C. The mixture is then cooled in the zone surrounded by first furnace 18 to a temperature between 300° and 550° C. to condense the zinc and zinc chloride. The reactor is tilted toward outlet 8 and the condensed zinc chloride and zinc (if any) flow out of outlet 8 through open valve 12 into a suitable container 24. In general, the container is provided with a suitable vent such as an opening (not shown) in the stopper 27 of container 24. Alternatively, the stopper may be eliminated and the annular space between outlet 8 and the mouth of the container may serve for venting. Other venting means such as a side outlet for container 24 may be employed. When all of the zinc chloride and zinc has been removed, the pure refractory metal may be removed from the reactor 3 by removing end 25 of reactor 3 which is connected to reactor 3 by a suitable connecting means 26.

The process and apparatus described above is well adapted for continuous reduction since the reactants entering the reaction zone, i.e. the zone surrounded by second furnace 19, are in the vapor state. While in the above-described apparatus the metal and other products are deposited in one end of reactor 3, a suitable scraping device on the end of a rod passing through a suitable seal in end 25 may be employed to periodically loosen the deposit whereby the deposit may be periodically removed by removing end 25 for a brief period without stopping the reaction in the reaction zone. Alternatively, the reaction product vapor and niobium powder may be passed directly out of the reactor and deposited in a separate container to facilitate the continuous reduction of the metal chloride.

The apparatus shown in FIGURE 1 and described above is superior to that of FIGURE 2 for the production of substantial quantities of the pure metal. However, where control of particle size and production of particles in a larger size range, i.e. +200 to −60 mesh, is of primary importance and quantity is secondary, the apparatus shown in FIGURE 2 is superior. In this apparatus the reduction is effected in the presence of an agitated bed and more specifically a fluidized suspension of finely divided particles of the metal being produced. Referring now more particularly to FIGURE 2 of the drawings, it will be seen that the apparatus illustrated therein includes a vertically disposed, cylindrical or tubular type reactor 30 having a removable end portion 31 connected to reactor 30 by connecting means 33 to permit cleaning, product removal, etc. and a zinc vaporizing tube 32 connected to reactor 30 by a conduit or tube 34. The reactor 30, vaporizer 32 and conduit 34 may be composed of high purity silica, quartz, silica glass, graphite or any other suitable material which is nonreactive toward the reactants and products under the prevailing reduction conditions. A container 35 of zinc 36 is provided in zinc vaporizing tube 32. Container 35 is provided with a control rod 37 which passes through a suitable means such as a close fitting opening in a rubber stopper 38 in the end of vaporizing tube 32. By means of control rod 37 the container 35 may be moved toward or away from an end of vaporizing tube 32. The container 35 may be removed for recharging by removing the end 39 of vaporizing tube 32 which is connected to tube 32 by a suitable connecting means 40. A suitable inlet 41 having a valve 42 is provided in the end of tube 32 opposite conduit 34, and a suitable inlet 43 and outlet 44 is provided in reactor 30. Conventional furnacing means 49 and 48 employing electric resistance elements 47 or other suitable heating means are associated with the reactor 30 and zinc vaporizing tube 32, respectively, to heat and maintain them individually at any desired temperature. Suitable heating means such as electric resistance elements 29 are associated with conduit 34. A perforated grid or porous filter element 50 made of silica wool, fritted high purity silica glass or quartz, or any other material which is inert to the materials being fed into the reactor 30, is suitably disposed in the bottom or lower portion of the reactor for a purpose to be later described. A conduit 51, controlled by a valve 52, is connected to inlet 43 of the reactor 30 by a suitable connecting means 53 and may communicate with a generator or vaporizer 54 from which a vaporized metal halide to be reduced in the system is fed to the reactor 30. The generator 54 is associated with a heating means indicated diagrammatically at 55 employing electric resistance elements 59 or other means adapted to maintain the generator 54 at any desired temperature and effect vaporization of a volatile metal halide 56 introduced into the generator from a source of supply (not shown) via a conduit 57. Through conduit 57 also may be introduced a gas selected from the group consisting of inert gas and hydrogen to assist in carrying or sweeping the halide into the reactor 30.

In the employment of an apparatus such as that described and shown in FIGURE 2, a sufficient quantity of the metal to be produced which is of high purity and powdered or ground to a size of −60 to +200 mesh is initially charged into the reactor 30 by removing end 31 to become supported therein on the retaining plate or porous filter element 50. The amount, particle size, and distribution of the metal so charged is such that when the flow of fluidizing gas fed to the reactor is adjusted to the desired rate for the reaction to proceed, a fluidized bed 58 of approximately 1½ times the original volume will be provided and maintained in the reactor 30.

Following introduction of the metal particles, a continuous flow of the gas selected from the group consisting of inert gases such as helium and argon and hydrogen is then passed upwardly through filter element 50 and into the reactor 30. The gas is supplied through inlet 41 by opening valve 42 and passing it through tube 32 and conduit 34. The charge of metal particles in the chamber becomes fluidized therein to form the bubbling bed 58 expanded to about 1½ times the static volume of the charge and the metal particles are maintained in constant agitated ebullient motion so that their entire surface becomes exposed for contact during the reduction reaction to be carried out within the reactor 30. The zinc vaporizing tube 32 and the reactor 30 are then heated to the desired temperature by respective furnacing means 48 and 49. The vaporizing tube 32 is heated to a temperature of at least 750° C. to provide adequate vapor pressure whereby the gas entering through inlet 41 may become mixed with the zinc vapor as it flows over the body of zinc 36. The percentage of zinc vapor in the gas mixture may be controlled by regulating the furnace temperature and/or positioning container 35 through the use of control rod 37 in the manner described above with regard to the embodiment of this inventon shown in FIGURE 1. The reactor 30 is maintained at a temperature at least as high as the temperature in the vaporizing tube 32 and, preferably, somewhat higher to prevent condensing of excess zinc in the reaction zone. Feed of vaporized metal chloride material is provided from generator 54 by heating generator 54 through the use of heating means 55. The metal chloride may be provided by boiling the metal chloride 56 in generator 54, or a sweep of inert gas or hydrogen passing through conduit 57 may be employed. In the latter case, the volatilized metal chloride is carried into the reactor by means of the flow of the sweep gas.

The reduction of the metal chloride to metal takes place in the fluidized bed 58, the metal formed being deposited on the bed particles. Unreacted hydrogen or inert gas and materials other than the pure metal are withdrawn from the top of the reactor through outlet 44. It has been found that where the reactor 30 extends an appreciable distance outside the furnacing means 49 the zinc chloride and zinc (if any) tend to condense in the upper portion of reactor 30 and may be collected by discharging through outlet 44 into a suitable container. The metal particles in the fluid bed are built up by deposition to larger and larger sizes. When the metal particles have been built up to the desired size, the gas flows are stopped by closing valves 42 and 52 and the particles of pure metal removed through the top of reactor 30 by removing cover 31.

An apparatus similar to that described above may be employed in a continuous process by providing a suitable inlet and an outlet on opposite sides of reactor 30 just above the filter 50. When the particles exceed a certain size, they no longer fluidize effectively. The oversize particles are supported on the filter and may be continuously removed through the outlet while small particles are injected into the reactor through the inlet. The maximum size of the particles which will fluidize depends upon various factors such as rate of flow of gas through filter 50. While some small particles will be removed with the large particles, they may be recovered in conventional classifying equipment and reintroduced into the reactor 30.

The following examples illustrate the practice of the method embodying the principles of this invention.

*Example I*

The reduction apparatus consists of a horizontal quartz tube such as that shown in FIGURE 1. The enlarged main portion of the tube is 3″ in internal diameter and 3½′ long, and the narrower forward section of the tube which contains a graphite container for zinc is 2″ in internal diameter and 3′ long. This tube is disposed in three resistance furnaces in line as shown in FIGURE 1.

The surface dimensions of the zinc in the graphite container are 12″ by 1¼″. The zinc in the graphite container is 99.9% pure and is volatilized at a temperature of 855° C. by heat from the first resistance furnace, i.e. the furnace surrounding the narrower forward section of the tube, and carried into the reaction zone at a rate of 605 grams per hour by a flow of hydrogen over the zinc at a rate of 5 liters per minute. The first furnace is 24″ long and the inlet end of the first furnace is positioned 12″ from the hydrogen inlet end of the reactor. The zinc container is positioned 20″ from the hydrogen inlet end of the reactor. The reaction zone in the central portion of the tube is maintained at 865° C. by the second resistance furnace which surrounds the central portion of the tube. The second resistance furnace is 24″ long and positioned adjacent the first resistance furnace.

Niobium pentachloride which is 99.8% pure is fed to the reaction zone from a generator such as generator 54 shown in FIGURE 2. The generator contains molten niobium pentachloride which is volatilized at a temperature of 230° C. by heat from a resistance furnace surrounding the generator and carried into the reaction zone of the quartz tube at the rate of 864 grams per hour by a flow of hydrogen at 1 liter per minute. This provides an amount of zinc in the system of about 12% in excess of the stoichiometric equivalent of the chlorine content of the niobium pentachloride and an amount of hydrogen of about two times the stoichiometric equivalent of the chlorine content of the niobium pentachloride. The condensing zone in the portion of the tube furthest removed from the narrow portion is maintained at 400° C. by the third resistance furnace, whereby the zinc chloride is in a liquid state which facilitates the trapping of niobium powder whereby the mixture is deposited on the walls. The third resistance furnace is 24″ long and positioned adjacent the second resistance furnace. The above procedure is carried out for a period of two hours. The mixed product from the condenser is scraped from the sides of the condensing zone of the reactor and loaded into a 3″ quartz tube wherein zinc chloride is distilled off at 750° C. by passing a helium sweep gas over the mixed product for one hour. After the bulk of the zinc chloride is thus removed, the temperature is increased to 1100° C. and the helium sweep is maintained for four hours. 565 grams of niobium is produced which has a particle size of from 0.2 to 3.0 microns. Metal recovery is better than 95%, based on the niobium pentachloride fed and the niobium product contains less than 100 p.p.m. of zinc and less than 200 p.p.m. of chloride.

*Example II*

The apparatus and procedure employed in this example are the same as for Example I. The zinc is 99.9% pure and is volatilized at a temperature of 880° C. and carried into the reaction zone at the rate of 815 grams per hour by the flow of helium over the zinc at the rate of 5.5 liters per minute. The graphite container is positioned 20″ from the helium inlet. The reaction zone is maintained at a temperature of 885° C. The niobium pentachloride is 99.8% pure and is volatilized at a temperature of 244° C. and carried into the reaction zone at a rate of 1040 grams per hour by a flow of helium over the niobium pentachloride at a rate of 1 liter per minute. This provides an amount of zinc in the system of about 28% in excess of the stoichiometric equivalent of the chlorine content of the niobium pentachloride. The condensing zone is maintained at a temperature of 450° C. The above procedure is carried out for a period of 1½ hours.

Zinc chloride and excess zinc are removed by distillation from the columbium powder with helium in the manner described in Example I. 495 grams of niobium are produced and the particle size is 0.2 to 3.0 microns. Metal recovery is 96% based on the niobium pentachloride fed. The zinc content of the metal powder is less than 100 p.p.m. and the chloride content is less than 400 p.p.m.

*Example III*

The apparatus and procedure employed in this example are the same as for Example I. The zinc is 99.9% pure and is volatilized at a temperature of 850° C. and carried into the reaction zone at the rate of 555 grams per hour by the flow of helium over the zinc at the rate of 5.5 liters per minute. The graphite container is positioned 20″ from the helium inlet. The reaction zone is maintained at a temperature of 870° C. Tantalum pentachloride, 99.8% pure, is volatilized at a temperature of 220° C. and carried into the reaction zone at a rate of 1095 grams per hour by a flow of helium in the tantalum pentachloride generator at a rate of 1 liter per minute. This provides an amount of zinc in the system of about 10% in excess of the stoichiometric equivalent of the chlorine content of the tantalum pentachloride. The condensing zone is maintained at a temperature of 450° C. The above procedure is carried out for a period of one hour.

Zinc chloride and excess zinc are removed by distillation from the tantalum powder with helium at 750° C. and 1100° C., respectively, in the manner described in Example I. 540 grams of tantalum are produced and the particle size is 0.2 to 3.0 microns. Metal recovery is 97% based on the tantalum pentachloride fed. The zinc content of the metal powder is less than 100 p.p.m. and the chloride content is less than 200 p.p.m.

*Example IV*

The apparatus and procedure employed in this example are the same as for Example I with the addition of a second generator such as generator 54 shown in FIGURE 2 containing tungsten hexachloride. The zinc is 99.9% pure and is volatilized at a temperature of 860° C. and carried into the reaction zone at the rate of 640 grams per hour by the flow of helium and hydrogen over the zinc at the rate of 5 liters per minute of helium and 1 liter per minute of hydrogen. The graphite container is positioned 21″ from the gas inlet. The reaction zone is maintained at a temperature of 870° C. The niobium pentachloride is 99.8% pure and is volatilized at a temperature of 219° C. and carried into the reaction zone at a rate of 400 grams per hour by a flow of helium through the niobium pentachloride at a rate of ¾ liter per minute. The tungsten hexachloride is 99.9% pure and is volatilized at a temperature of 305° C. and carried into the reaction zone at a rate of 588 grams per hour by a flow of helium through the tungsten hexachloride at a rate of ¾ liter per minute. The zinc is maintained at about 20% in excess of the stoichiometric equivalent of the chlorine content of the niobium pentachloride and tungsten hexachloride. The condensing zone is maintained at a temperature of 400 to 450° C. The above procedure is carried out for a period of two hours.

Zinc chloride is removed by an argon sweep gas at 800° C. for one hour and zinc is removed by heating to 1100° C. for three hours with an argon sweep gas. The collected product of the co-reduced niobium-tungsten metal weighed 738 grams for a 90% recovery of the metal values. The product is 67% tungsten and 33% niobium. The particle size is 0.2 to 3.0 microns.

*Example V*

The apparatus and procedure employed in this example are the same as for Example I. The zinc is 99.9% pure and is volatilized at a temperature of 820° C. and carried into the reaction zone at a rate of 270 grams per hour by a flow of hydrogen over the zinc at a rate of 3 liters per minute. The graphite container for the zinc is positioned 20″ from the hydrogen inlet. The reaction zone is maintained at a temperature of 860° C.

The niobium pentachloride is 99.8% pure and is volatilized at a temperature of 225° C. and carried into the reaction zone at the rate of 500 grams per hour by a flow of hydrogen at 1 liter per minute. This provides an amount of zinc in the system of about 90% of the stoichiometric equivalent of the chlorine content of the niobium pentachloride and an amount of hydrogen of about two times the stoichiometric equivalent of the chlorine content of the niobium pentachloride. The condensing zone is maintained at a temperature of 400° C. The above procedure is carried out for a period of two hours. The mixed product from the condenser is scraped from the sides of the condensing zone in the reactor and located into a 2″ quartz tube wherein zinc chloride is distilled off with a helium gas sweep in the manner described in Example I. 330 grams of niobium are produced and the particle size is from 0.2 to 3.0 microns. Metal recovery is better than 97%, based on the niobium pentachloride fed and the zinc content is less than 50 p.p.m. and the chloride content is less than 200 p.p.m.

*Example VI*

The reduction apparatus consists of a horizontal high purity silica tube such as that shown in FIGURE 1. The enlarged main portion of the tube is 3″ in internal diameter and 65″ long, and the narrower forward section of the tube which contains a graphite container for zinc is 2″ in internal diameter and 35″ long. The inside dimensions of the graphite container are 12″ by 1¼″ by 1″. The tube is disposed in three resistance furnaces in line as shown in FIGURE 1. The zinc in the graphite container is 99.9% pure and is volatilized at a temperature of 783° C. by the first resistance furnace, i.e. the furnace surrounding the narrower forward section of the tube and carried into the reaction zone at a rate of 56.5 grams per hour by a flow of hydrogen over the zinc at a rate of 1500 cc. per minute. The first furnace is 24″ long and the inlet end of the first furnace is positioned 10″ from the hydrogen inlet end of the reactor. The graphite container for the zinc is positioned 20″ from the hydrogen inlet. The reaction zone in the central portion of the tube is maintained at 850° C. by the second resistance furnace which surrounds the central portion of the tube. The second resistance furnace is 24″ long and positioned adjacent the first resistance furnace.

99.8% pure niobium pentachloride is then fed to the reaction zone from a generator such as generator 54 shown in FIGURE 2. The generator contains molten niobium pentachloride which is volatilized at a temperature of 215° C. by a resistance furnace surrounding the generator and carried into the reaction zone of the quartz tube at the rate of 100 grams per hour by a flow of hydrogen at 750 cc. per minute. This provides an amount of zinc in the system of about 7% less than the stoichiometric equivalent of the chlorine content of the niobium pentachloride and an amount of hydrogen of about six times the stoichiometric equivalent of the chlorine content of the niobium pentachloride. The above procedure is carried out for a period of 1½ hours. The condensing zone in the portion of the tube furthest removed from the narrow portion is maintained at 350° C. by the third resistance furnace, whereby the zinc chloride is in a liquid state which facilitates the trapping of niobium powder whereby the mixture is deposited on the walls. The third resistance furnace is 24″ long and positioned adjacent the second resistance furnace. The mixed product from the condenser is scraped from the sides of the condensing zone in the reactor into a 3″ quartz tube wherein zinc chloride is distilled off at 750° C. with a hydrogen gas sweep. After the bulk of the zinc chloride is thus removed, the temperature is increased to 1050° C. and the hydrogen sweep is maintained for four hours. The product is then cooled to 500° C. and maintained at that temperature for one hour with the hydrogen sweep to form the hydride. 46.0 grams of a mixture of niobium and niobium hydride are produced and the particle size is 0.2 to 2.0 microns. Metal recovery is better than 90%, based on the niobium pentachloride fed, the zinc content is 150 p.p.m., the chloride content is less than 200 p.p.m. and the hydrogen content is 0.5%.

*Example VII*

The reduction apparatus consists of a vertical quartz tube 2″ in internal diameter and 21″ long and a horizontal quartz tube which contains a graphite container for the zinc which is 2″ in internal diameter and 31″ long. The inside dimensions of the graphite container are 6½″ by 1¼″ by 1″. The bottom of the vertical tube is connected to the closest end of the horizontal tube by a ½″ internal diameter quartz tube. Both the vertical and horizontal tubes are disposed in resistance furnaces as shown in FIGURE 2. One furnace extends from just below the bottom of the vertical tube to a position 4″ below the outlet of the vertical tube. The other furnace extends from just beyond the end of the horizontal tube which was connected to the conduit to a position 7″ from the gas inlet end of the horizontal tube. The conduit is heated by wrapping it with electrical resistance heating elements. The graphite zinc container is positioned 18″ from the gas inlet end of the horizontal tube. 1200 grams of niobium powder having a particle size in the fraction which passes through 60 mesh screen and is retained on a 200 mesh screen were charged to the vertical tube which was provided with a fritted quartz disk at the bottom thereof to retain the niobium charge within the tube. The charge of niobium was fluidized to one and one-half times its static bed volume by means of the upward flow through the quartz disk and the vertical tube of hydrogen gas which was supplied through the inlet at one end of the horizontal tube, thereby passing through the horizontal tube, the ½″ connection tube and then upward through the vertical tube to fluidize the bed. The gas is passed through the vertical tube at a linear flow of 0.5 feet per second. The charge of metal particles becomes fluidized to form a bubbling bed expanded to about one and one-half times the static volume of the charge whereby the particles are maintained in constant agitated ebullient motion.

The zinc in the graphite container is 99.9% pure and is volatilized at a temperature of 820° C. by the resistance furnace surrounding the horizontal tube and carried into the reaction zone at a rate of 235 grams per hour by the flow of the hydrogen over the zinc. The niobium bed in the vertical tube is maintained at 850° C. by the second resistance furnace which surrounds the vertical tube.

99.8% pure niobium pentachloride is then fed to the reaction zone from a generator such as generator 54 shown in FIGURE 2. The generator contains molten niobium pentachloride which is volatilized at a temperature of 225° C. by a resistance furnace surrounding the generator and carried into the reaction zone of the quartz tube at the rate of 360 grams per hour by a flow of hydrogen at 750 cc. per minute. This provides an amount of zinc of about 7% in excess of the stoichiometric equivalent of the chlorine content of the niobium pentachloride and an amount of hydrogen of about 14 times the stoichiometric equivalent of the chlorine content.

Reduction occurs within the moving bed with the excess zinc and zinc chloride passing out of the reactor as vapor in the hydrogen stream and removed by condensation. This above procedure is carried out for a period of about two hours. The increase in the weight of the niobium bed at the termination of the run is 240 grams which indicates essentially complete recovery of the niobium as metal from the niobium pentachloride fed to the reactor.

*Example VIII*

The apparatus, procedure, conditions, amounts, etc. employed in this example are the same as in Example VII. However, helium replaces hydrogen as the fluidizing and sweep gas. A lesser helium flow is required to achieve the degree of fluidization indicated in Example VII. A flow rate of 14 liters per minute is satisfactory. The increase in the bed weight is 235 grams which indicates essentially complete recovery of the niobium.

While there has been shown and described hereinabove the present preferred embodiments of this invention, it is to be understood that various changes, alterations and modifications can be made thereto without departing from the spirit and scope thereof as defined in the appended claims.

We claim:

1. A method for producing a metal selected from the group consisting of niobium, tantalum, molybdenum and tungsten comprising the steps of passing zinc vapor into contact with a chloride of said metal in a reaction zone maintained at a temperature of about 750 to 1100° C. to effect reduction of said chloride to produce a mixture of said metal and zinc chloride and separating said metal from said zinc chloride by condensing and depositing said mixture at a temperature of from about 350 to 550° C., passing inert gas over said deposit and heating said deposit to a temperature ranging from about 750 to 1100° C. whereby said zinc chloride is vaporized and carried away by the gas flow leaving a deposit of said metal.

2. The method of claim 1 wherein said inert gas is selected from the group consisting of hydrogen, helium and argon.

3. The method of claim 1 wherein said metal is niobium.

4. A method for producing a metal product comprising the steps of passing zinc vapor into contact with the chlorides of at least two metals selected from the group consisting of niobium, tantalum, molybdenum and tungsten in a reaction zone maintained at a temperature of from about 750 to 1100° C. to effect reduction of said chloride to produce a mixture of the metals and zinc chloride and separating said zinc chloride from the metals by condensing and depositing said mixture at a temperature of from about 350 to 550° C., passing inert gas over said deposit and heating said deposit to a temperature ranging from about 750 to 1100° C. whereby said zinc chloride is vaporized and carried away by the gas flow leaving a deposit of said metals.

5. A method for producing a hydride selected from the group consisting of niobium hydride and tantalum hydride comprising the steps of passing zinc vapor into contact with a chloride of the metal from which the hydride is formed in a reaction zone maintained at a temperature of about 750 to 1100° C. to effect reduction of said chloride and produce a mixture of said metal and zinc chloride and separating said metal from said zinc chloride by condensing and depositing said mixture at a temperature of from about 350 to 550° C., passing an inert gas over said deposit and heating said deposit to a temperature ranging from about 750 to 1100° C. whereby said zinc chloride is vaporized and carried away by the gas flow leaving a deposit of said metal and contacting said metal with hydrogen at a temperature of from about 350 to 550° C.

6. A method for producing a metal selected from the group consisting of niobium, tantalum, molybdenum, and tungsten comprising the steps of passing zinc vapor into contact with a chloride of said metal in a reaction zone maintained at a temperature of about 750 to 1100° C. to effect the reduction of said chloride, the amount of zinc being at least equal to the stoichiometric equivalent of the chlorine content of said chloride to produce a mixture of said metal and zinc chloride and separating said metal from said zinc chloride by condensing and depositing said mixture at a temperature of from about 350 to 550° C., passing inert gas over said deposit and heating said deposit to a temperature ranging from about 750 to 1100° C. whereby said zinc chloride is vaporized and carried away by the gas flow leaving a deposit of said metal.

7. A method for producing a metal selected from the group consisting of niobium, tantalum, molybdenum, and tungsten comprising the steps of reducing a chloride of said metal with a mixture of hydrogen and zinc vapor in a reaction zone maintained at a temperature from about 750 to about 1100° C., the amount of zinc being less than the stoichiometric equivalent of the chlorine content of said chloride, to produce a mixture of said metal and zinc chloride and separating said metal from said zinc chloride by condensing and depositing said mixture at a temperature of from about 350 to 550° C., passing an inert gas over said deposit and heating said deposit to a temperature ranging from about 750 to 1100° C. whereby said zinc chloride is vaporized and carried away by the gas flow leaving a deposit of said metal.

8. The method of claim 7 wherein said metal is niobium, said chloride is niobium pentachloride, the amount of zinc is about 80 to 95% of the stoichiometric equivalent of the chlorine content of the niobium pentachloride and the amount of hydrogen is at least two times the stoichiometric equivalent of the chlorine content of the niobium pentachloride.

9. A method for producing metal selected from the group consisting of niobium, tantalum, molybdenum and tungsten comprising the steps of passing inert gas into association with a body of zinc at a temperature of from about 750 to 950° C. to produce a mixture of said gas and zinc vapor, passing said mixture into contact with a chloride of said metal in a reaction zone maintained at a temperature of from about 750 to 1100° C. to effect reduction of said chloride to produce a mixture of said metal and zinc chloride and separating said metal from said zinc chloride by cooling said mixture to a temperature of from about 350 to 550° C. and depositing a major portion of said mixture, passing inert gas over said deposit and heating said deposit to a temperature of about 750 to 1100° C. whereby said zinc chloride is vaporized and carried away by the gas flow leaving a deposit of said metal.

10. The method of claim 9 wherein said inert gas is selected from the group consisting of hydrogen, helium and argon.

References Cited by the Examiner

UNITED STATES PATENTS

| | | | |
|---|---|---|---|
| 2,758,021 | 8/56 | Drapeau | 72—26 X |
| 2,983,600 | 5/61 | Blue et al. | 75—84.5 |
| 3,012,876 | 12/61 | Eaton et al. | 75—26 |
| 3,020,128 | 2/62 | Adcock et al. | 75—84.5 X |
| 3,020,148 | 2/62 | Jenkins et al. | 75—26 |

FOREIGN PATENTS 386,621  4/31  Great Britain.

BENJAMIN HENKIN, *Primary Examiner.*

DAVID L. RECK, *Examiner.*